United States Patent
Chin et al.

(10) Patent No.: US 6,216,190 B1
(45) Date of Patent: Apr. 10, 2001

(54) SYSTEM AND METHOD FOR OPTIMALLY DEFERRING OR RETRYING A CYCLE UPON A PROCESSOR BUS THAT IS DESTINED FOR A PERIPHERAL BUS

(75) Inventors: Kenneth T. Chin, Cypress, TX (US); Clarence K. Coffee, Pembroke Pines, FL (US); Michael J. Collins, Tomball, TX (US); Jerome J. Johnson; Phillip M. Jones, both of Spring, TX (US); Robert A. Lester, Houston, TX (US); Gary J. Piccirillo, Cypress, TX (US)

(73) Assignee: Compaq Computer Corporation, Houston, TX (US)

( * ) Notice: Subject to any disclaimer, the term of this patent is extended or adjusted under 35 U.S.C. 154(b) by 0 days.

(21) Appl. No.: 09/164,192

(22) Filed: Sep. 30, 1998

(51) Int. Cl.$^7$ ........................................ G06F 13/42
(52) U.S. Cl. .................. 710/128; 710/101; 710/129; 711/146
(58) Field of Search ..................... 710/101, 128, 710/129; 711/146

(56) References Cited

U.S. PATENT DOCUMENTS

| | | | |
|---|---|---|---|
| 5,572,703 | * 11/1996 | MacWilliams et al. | 711/146 |
| 5,737,758 | * 4/1998 | Merchant | 711/146 |
| 5,796,977 | * 8/1998 | Sarangdhar et al. | 709/1 |
| 5,835,741 | * 11/1998 | Elkhoury et al. | 710/129 |
| 5,870,567 | * 2/1999 | Hausauer et al. | 710/101 |
| 5,961,621 | * 10/1999 | Wu et al. | 710/107 |

* cited by examiner

*Primary Examiner*—Kenneth S. Kim
(74) *Attorney, Agent, or Firm*—Conley, Rose & Tayon; Kevin L. Daffer

(57) ABSTRACT

A computer is provided having a bus interface unit coupled between a CPU bus, a peripheral bus, and a memory bus. The bus interface unit includes a processor controller linked to the CPU bus for controlling the transfer of cycles from the CPU to the peripheral bus and memory bus. Those cycles can be arranged in order within the CPU bus pipeline. A subset of cycles destined for a peripheral bus can be stalled within a snoop phase associated with the CPU bus. Snoop stall can continue until a memory cycle is encountered upon the CPU bus pipeline within a phase prior to the snoop phase. Once the memory cycle progresses to the snoop phase, snoop stall can be discontinued and the previous, peripheral cycles can then be deferred and/or retried, allowing the memory cycle to be quickly dispatched through all phases of the CPU bus and onto the memory bus. In this fashion, memory cycles can be completed quickly, yet deferrals or retries are minimized to avoid the throughput penalty associated with deferring or retrying cycles back again through each phase of the CPU bus.

22 Claims, 5 Drawing Sheets

SYSTEM AND METHOD FOR OPTIMALLY DEFERRING OR RETRYING A CYCLE UPON A PROCESSOR BUS THAT IS DESTINED FOR A PERIPHERAL BUS

BACKGROUND OF THE INVENTION

1. Field of the Invention

This invention relates to a computer and, more particularly, to a bus interface unit which can stall read and non-postable write cycles issued to a peripheral bus until the peripheral bus becomes available or a cycle occurs to system memory. If a cycle is issued to system memory, then the bus interface unit either defers or retries the prior cycles to the peripheral bus after the cycle to system memory completes.

2. Description of the Related Art

Modem computers are called upon to execute instructions and transfer data at increasingly higher rates. Many computers employ CPUs which operate at clocking rates exceeding several hundred MHz, and further have multiple busses connected between the CPUs and numerous input/output devices. The busses may have dissimilar protocols depending on which devices they link. For example, a CPU local bus connected directly to the CPU preferably transfers data at a faster rate than a peripheral bus connected to slower input/output devices. A mezzanine bus may be used to connect devices arranged between the CPU local bus and the peripheral bus. The peripheral bus can be classified as, for example, an industry standard architecture ("ISA") bus, an enhanced ISA ("EISA") bus or a microchannel bus. The mezzanine bus can be classified as, for example, a peripheral component interconnect ("PCI") bus to which higher speed input/output devices can be connected.

Coupled between the various busses are bus interface units. According to somewhat known terminology, the bus interface unit coupled between the CPU bus and the PCI bus is often termed the "north bridge". Similarly, the bus interface unit between the PCI bus and the peripheral bus is often termed the "south bridge".

The north bridge, henceforth termed a bus interface unit, serves to link specific busses within the hierarchical bus architecture. Preferably, the bus interface unit couples data, address and control signals forwarded between the CPU local bus, the PCI bus and the memory bus. Accordingly, the bus interface unit may include various buffers and/or controllers situated at the interface of each bus linked by the interface unit. In addition, the bus interface unit may receive data from a dedicated graphics bus, and therefore may include an advanced graphics port ("AGP"). As a host device, the bus interface unit may be called upon to support both the PCI portion of the AGP (or graphics-dedicated transfers associated with PCI, henceforth is referred to as a graphics component interconnect, or "GCI"), as well as AGP extensions to the PCI protocol.

There are numerous tasks performed by the bus interface unit. For example, the bus interface unit must orchestrate timing differences between a faster CPU local bus and a slower mezzanine bus, such as a PCI bus. The bus interface unit should also give priority to certain types of transfers. For example, a cycle initiated by the CPU to memory must, in most instances, be completed quickly. If not, the processor-to-memory queue may not be optimally filled and instructions may not be expeditiously executed.

One mechanism in which to account for timing differences involves, for example, stalling cycles within the CPU local bus to allow the peripheral bus to catch up. This, however, penalizes CPU throughput and should be used only sparingly and judiciously. Stalling the CPU bus typically occurs during a particular transaction phase of the CPU bus pipeline. It is noted that modem CPUs utilize an extensive pipeline which can store multiple cycles of multiple transactions upon the CPU local bus. For example, a Pentium® Pro processor bus includes a decoupled, 12-stage super pipelined implementation. A transaction relating to a single bus request can sequentially pipeline through numerous phases: arbitration, request, error, snoop, response and data transfer.

Stalling the CPU local bus generally involves stalling one or more cycles in the snoop phase. This affords the earlier phases to receive cycles and have those cycles available in the snoop phase. If called upon, those cycles can be released in a timely fashion to the subsequent response and data transfer phases.

FIG. 3 illustrates a timing diagram of exemplary transaction phases of the Pentium® Pro processor bus. In the example shown, a cycle $8a$ of a first transaction 8 requires approximately three bus clock cycles to obtain mastership of the CPU local bus. Approximately two clock cycles later, cycle $8a$ proceeds from the arbitration phase to a request phase $8b$. As shown, the cycle $8c$ begins in the error phase approximately three clocks after the request phase. Cycle $8d$ occurs approximately four clocks after the request phase or approximately three clocks after the previous transaction snoop cycle, whichever is later. The cumulative number of clock cycles needed to place a transaction within the snoop phase is shown to be approximately ten clock cycles, in the example provided. Of course, as transaction 8 progresses to the snoop phase, a cycle $9d$ of another transaction 9 can subsequently arrive in the snoop phase as well.

If the first transaction 8 is initiated from the CPU to a peripheral device as its final destination, then it may be necessary to delay the transaction in the snoop phase to allow the peripheral bus to clear and/or data upon the peripheral bus to become available. For example, if a transaction preceding the first transaction 8 is a non-postable write to the peripheral device, then it is necessary that the peripheral device and the peripheral bus become available before data of transaction 8 is presented upon the bus. Alternatively, if transaction 8 is a read transaction, it is necessary that the data to be read from the peripheral device be present on the peripheral bus before the local CPU bus can transfer that data during the data transfer phase. For at least these reasons, cycles within the CPU bus destined for a slower peripheral bus must occasionally be stalled in the snoop phase of the CPU bus until the peripheral bus clears and/or data therein is available.

Stalling the CPU bus at the snoop phase is typically done a fixed number of clock cycles. That is, historical differences between the peripheral bus (and peripheral device) and the CPU bus speed indicates that the peripheral bus or data on the peripheral bus will be made available some time after a transaction is completed on the CPU bus. The next transaction to the peripheral is then stalled a fixed amount of time mandated by the historically derived differences in the bus speeds. Thus, regardless of destinations for the subsequent transactions, the current transactions are stalled a fixed number of clock cycles to allow the peripheral bus to clear. This, unfortunately, will penalize throughput of all subsequent cycles (including memory cycles).

In an attempt to immediately service transactions to local memory (and i.e., system memory of substantially contiguous semiconductor memory space) many conventional techniques allow memory cycles to be completed through the CPU bus ahead of cycles to peripheral devices. This involves a technique known as cycle "deferral" of preceding, slower peripheral-destined cycles, and allowing faster, memory-destined cycles to be drawn from the in-order queue of the pipeline.

Referring to FIG. 3 and the two-transaction example shown, deferral of first transaction 8 may occurs at the snoop phase by tagging transaction 8 and allowing the second transaction 9 to proceed as cycles 9e and 9f within respective response and data transfer phases. In this manner, priority is given to a transaction which must be quickly serviced over that of another transaction which need not be transferred as quickly, possibly due to the slower nature of its destination device. Accordingly, the example shown in FIG. 3 illustrates a first transaction 8 destined for a slower peripheral device coupled to either a mezzanine bus or a peripheral bus, whereas the second transaction 9 is destined for semiconductor memory.

An unfortunate result of deferral technique is that the transaction being deferred at the snoop phase must be re-initiated at a later time beginning at the arbitration phase. As shown in FIG. 3, the ten cycles needed to place the transaction in the snoop phase must be re-initiated for a penalty of approximately ten CPU bus cycles. Many conventional pipeline schemes immediately defer any cycles destined for a peripheral device. The destination is detected at the snoop phase by the snoop agent. When the snoop agent is a peripheral device, that agent will return a signal causing the snoop phase to initiate a DEFER# signal. DEFER# removes the transaction from the in-order queue by generating the appropriate response. All peripheral-destined transactions will then be automatically deferred in favor of memory-destined transactions. Thus, there may be multiple transactions being deferred unless the snoop agent indicates the peripheral bus and/or device is available. In this manner, each transaction must undergo a ten clock cycle penalty if the peripheral bus, peripheral device, or data is not available when snoop occurs. When the peripheral bus, device or data later becomes available, then the peripheral-destined transaction will proceed through the remaining phases, beginning with the arbitration phase.

The aforementioned, conventional algorithm pays a rather large penalty for each deferral which may not be necessary. It would be more beneficial to simply stall the transaction at the snoop phase, but to do so only under certain conditions. Likewise, deferral of peripheral-destined transactions must be minimized and made dependent on the timing and type of transactions subsequently arriving in the pipeline.

SUMMARY OF THE INVENTION

The problems outlined above are in large part solved by a computer employing an improved bus interface unit. The bus interface unit includes a processor interface which can selectively defer one or more cycles received on the local CPU bus. The bus interface unit is therefore configured between the CPU (or processor) local bus, a graphics bus (e.g., AGP), a PCI bus and a memory bus. The CPU bus can link at least one and certainly more CPUs and associated cache storage locations within those CPUs. Additionally, the memory bus links a memory controller within the bus interface unit to system memory denoted as semiconductor memory. Examples of suitable system memory include, for example, DRAM or synchronous DRAM (SDRAM). If the graphics bus is an AGP/PCI bus then it may be linked to the bus interface unit by an AGP interface to effectuate e.g. 66 MHz 1x AGP transfers or 133 MHz 2x AGP data transfers. The bus interface unit maintains a PCI interface which is synchronous to the CPU interface and supports PCI burst cycles.

The bus interface unit is suited to account for timing differences between the CPU local bus and the slower PCI or AGP bus. The processor controller within the bus interface unit also gives priority to memory cycles. In this manner, the processor controller can stall cycles destined for the peripheral device a multiple number of (e.g., a multiple of two) CPU clock cycles. The amount of stall occurring in the snoop phase of the CPU bus depends on many factors, some of which are the availability of the peripheral bus, availability of data within the peripheral bus, or subsequent memory-destined cycles arriving in the pipeline and in the snoop phase.

The processor controller within the present bus interface unit can therefore dynamically alter the amount of snoop stall depending on when it is optimally desired to either terminate snoop stall or defer one or more cycles being stalled. If a memory-destined cycle is placed on the pipeline and arrives on the snoop phase before the previous cycle or cycles complete on the peripheral bus, then the current cycle will be deferred to allow the memory-destined cycle to run as fast as possible and complete on the CPU bus. Beneficially, peripheral-destined cycles will be snoop stalled as long as possible depending on the status of subsequent cycles, and the peripheral bus. Furthermore, deferral of cycles will only occur if the cycle cannot be further stalled due to a need for transferring a memory-destined cycle immediately to the memory controller and then to memory. In this fashion, cycles which need to complete quickly (e.g., memory-destined cycles) are serviced ahead of peripheral-destined cycles if the peripheral-destined cycles are being stalled. The peripheral-destined cycles are stalled as long as possible without having to pay the penalty for deferring those cycles except if deferral is not needed. The present deferral technique is therefore dynamic, where cycle deferrals are minimized and snoop stalls for transactions can vary an almost unlimited number of bus clock cycles.

Broadly speaking, a computer is presented. The computer includes a bus interface unit arranged on a printed circuit board. Also included with the computer is a peripheral device coupled to a printed circuit board outside that which accommodates the bus interface unit. The bus interface unit is coupled between a processor bus, a peripheral bus, and a memory bus. Embodied upon the bus interface unit is a processor control interface adapted to receive a peripheral cycle issued from the processor bus to the peripheral bus. The processor control interface is further adapted to stall the peripheral cycle during a snoop phase of the processor bus until the peripheral bus becomes available or a memory cycle is pipelined onto the snoop phase. The peripheral cycle can be deferred when the memory cycle is pipelined onto the snoop phase. Accordingly, the peripheral cycle is deferred during the snoop phase for a time period after which the memory cycle has at least partially completed phases subsequent to the snoop phase. If the peripheral cycle is non-deferrable, it can be forwarded to a response phase and re-tried by the processor after the memory cycle has completed phases subsequent to the snoop phase.

According to another embodiment, a processor bus is presented. The processor bus includes a plurality of phases which can accommodate a plurality of cycles of dissimilar transactions pipelined in sequential order upon the bus. A peripheral cycle is destined for a peripheral device, and a memory cycle is destined for semiconductor memory. The peripheral cycle is clocked through a subset of the plurality of phases and into a snoop phase of the plurality of phases. The memory cycle is clocked entirely through the plurality of phases while the peripheral cycle is stalled within the snoop phase and then deferred from the snoop phase to an initial phase of the sequential order of phases.

According to yet another embodiment, a method is provided for servicing a memory cycle ahead of a peripheral cycle. The method includes stalling the peripheral cycle within a snoop phase of a processor bus. The peripheral cycle may then be deferred when the memory cycle arrives within the snoop phase. The memory cycle may be allowed to continue at least partially through the remaining phases of the processor bus before re-issuing the peripheral cycle from an initial phase of the processor bus. The step of stalling the peripheral cycle may continue a variable number of, e.g., two clock cycles until data from a non-posted write transaction has been completed on the peripheral bus or data from a read transaction has arrived from the peripheral bus. Stalling may also continue until the memory cycle arrives within the snoop phase and, if the peripheral cycle is non-deferrable, the peripheral cycle can be re-tried from the initial phase of the sequence of phases.

BRIEF DESCRIPTION OF THE DRAWINGS

Other objects and advantages of the invention will become apparent upon reading the following detailed description and upon reference to the accompanying drawings in which.

Figure 1:
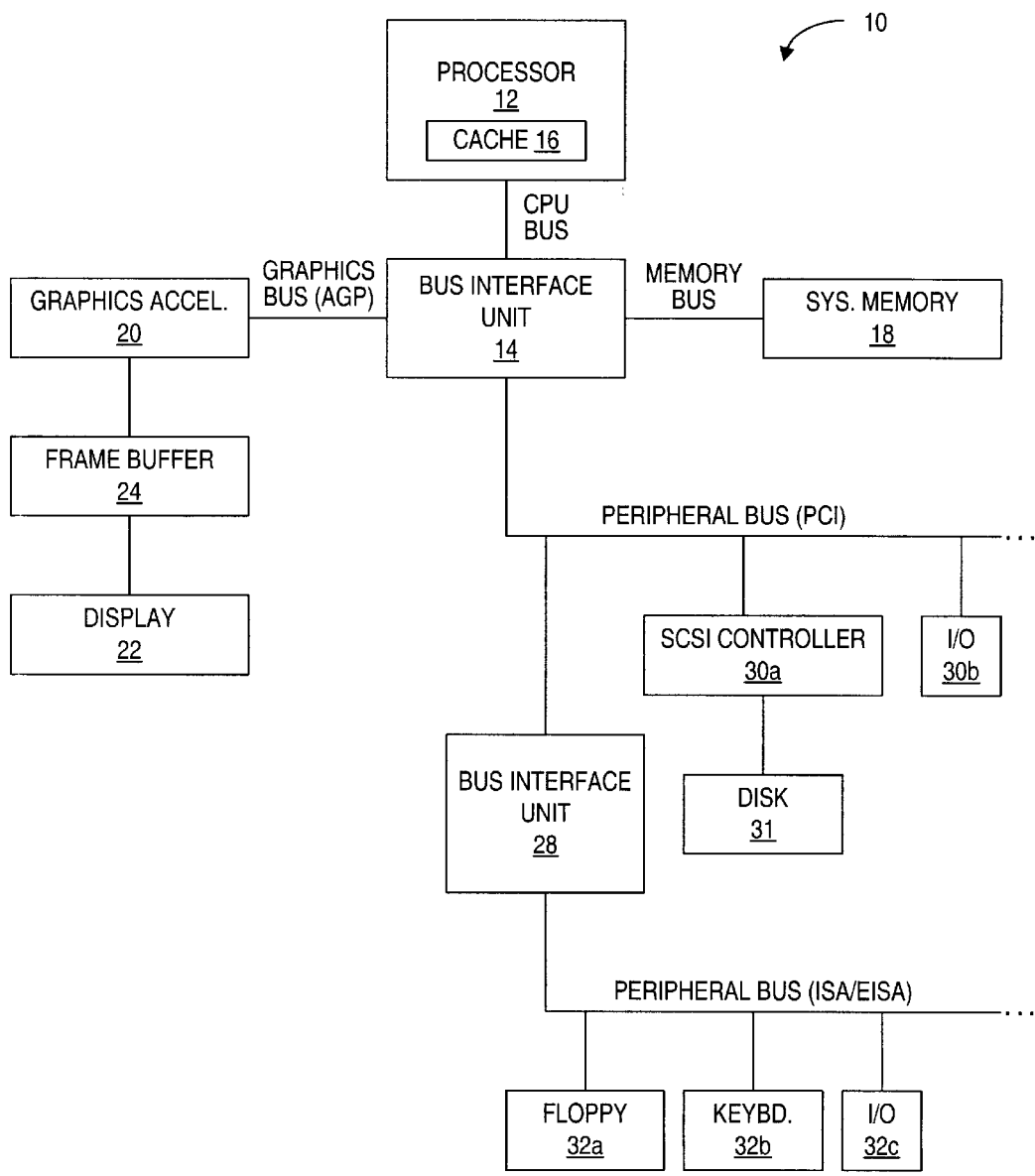
FIG. 1 is a block diagram of a computer system comprising various buses and bus interface units.

While the invention may be modified and have alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF PREFERRED EMBODIMENTS

Turning now to FIG. 1, a computer 10 is illustrated having multiple busses, including a CPU bus, a mezzanine or PCI bus, and a peripheral bus or ISA/EISA bus. The CPU bus connects a CPU or processor 12 to a bus interface unit or north bridge 14. A cache memory 16 is preferably embodied within processor 12 and/or linked to processor 12 by the CPU bus. Bus interface unit 14 provides an interface between components clocked at similar rates. Bus interface unit 14 preferably contains a memory controller which allows communication to and from system memory 18. A suitable system memory 18 comprises DRAM or SDRAM. Interface unit 14 may also include a graphics port to allow communication to a graphics accelerator 20. A graphics port, such as AGP, provides a high performance, component level interconnect targeted at three dimensional graphics display applications and is based on performance extensions or enhancements to PCI. AGP interfaces are generally standard in the industry, the description of which is available from Intel Corporation.

Generally speaking, AGP is physically, logically, and electrically independent of the PCI bus and is intended for the exclusive use of a display device 22 coupled to the graphics port (AGP) by a graphics accelerator and local memory or frame buffer 24. The form and function of a typical graphics accelerator is generally known in the art to render three dimensional data structures which can be effectively shifted into and from system memory 18 to alleviate increased costs of local graphics memory. Frame buffer 24 is generally understood as any buffer which can capture a frame of memory, defined as a still picture. Display 22 is any electronic display upon which an image or text can be presented. A suitable display 22 includes a cathode ray tube ("CRT") a liquid crystal display ("LCD"), etc.

Interface unit 14 is generally considered an application specific chip set or application specific integrated circuit ("ASIC") that provides connectivity to various busses, and integrates other system functions such as memory interface and P1394. Systems memory 18 is considered the main memory and refers to a portion of the addressable memory that the majority of memory accesses target. System memory is accessed via interface unit 14, and is considered the largest continuous memory space of computer 10.

Unlike the CPU bus which runs at speeds comparable to CPU 120, PCI bus generally runs at speeds of, e.g., 33 MHz or lower. Another bus interface unit 28 is coupled between two dissimilar peripheral busses (i.e., the PCI bus and the ISA/EISA bus). Similar to unit 14, unit 28 is an ASIC or group of ASICs that provide connectivity between various busses, and may also include system function which can possibly integrate one or more serial ports. Attributed to the PCI bus are input/output ("I/O") devices 30, one of which can be a SCSI controller link between, for example, a secondary disk drive and the PCI bus. I/O devices 30 generally operate at higher speeds than I/O devices 32, examples of which include a floppy disk drive, a keyboard, etc.

Figure 2:
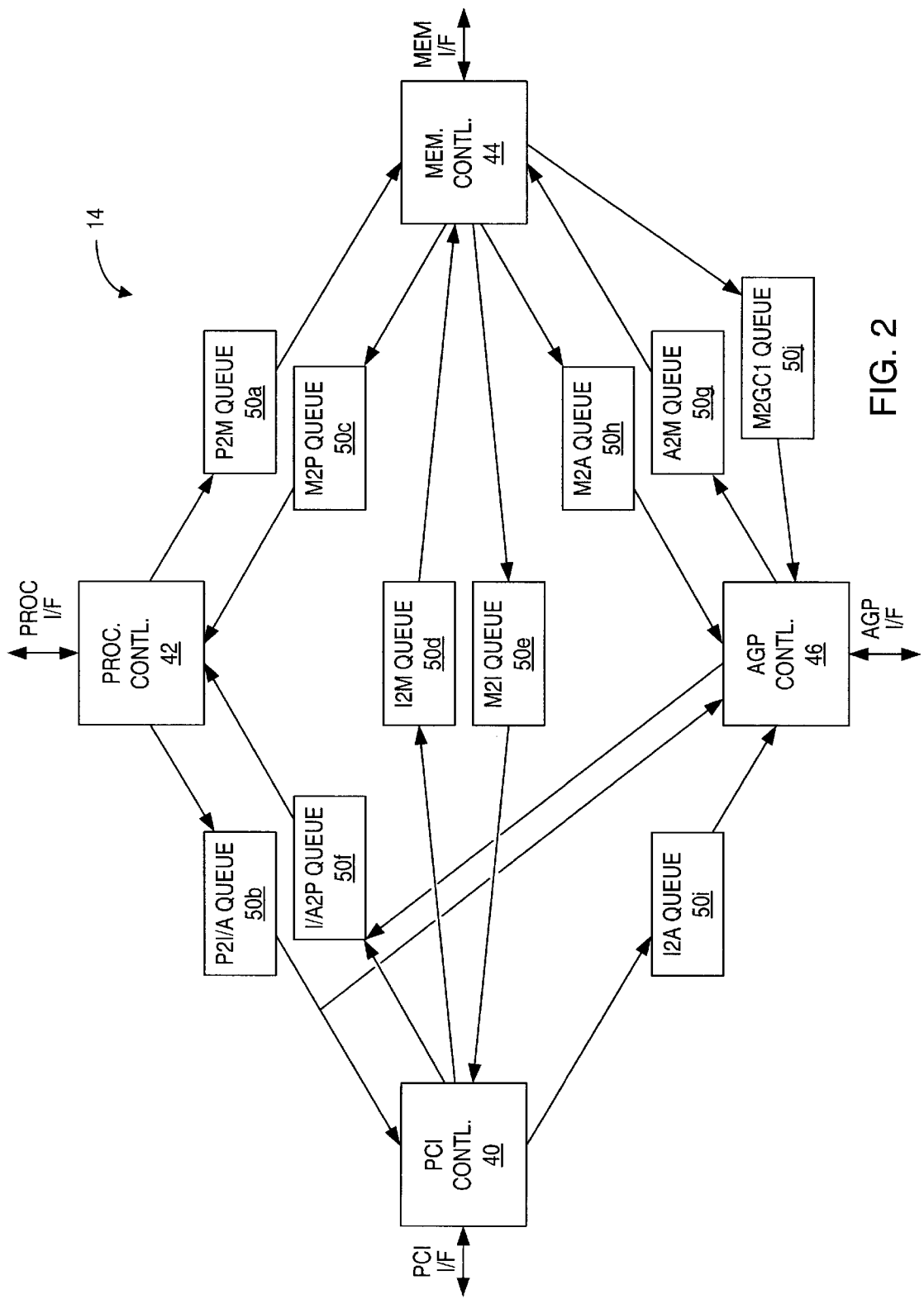
FIG. 2 is a block diagram of a bus interface unit containing address and data queues coupled between a processor bus, a PCI bus, a graphics bus and a system memory.
Figure 3:
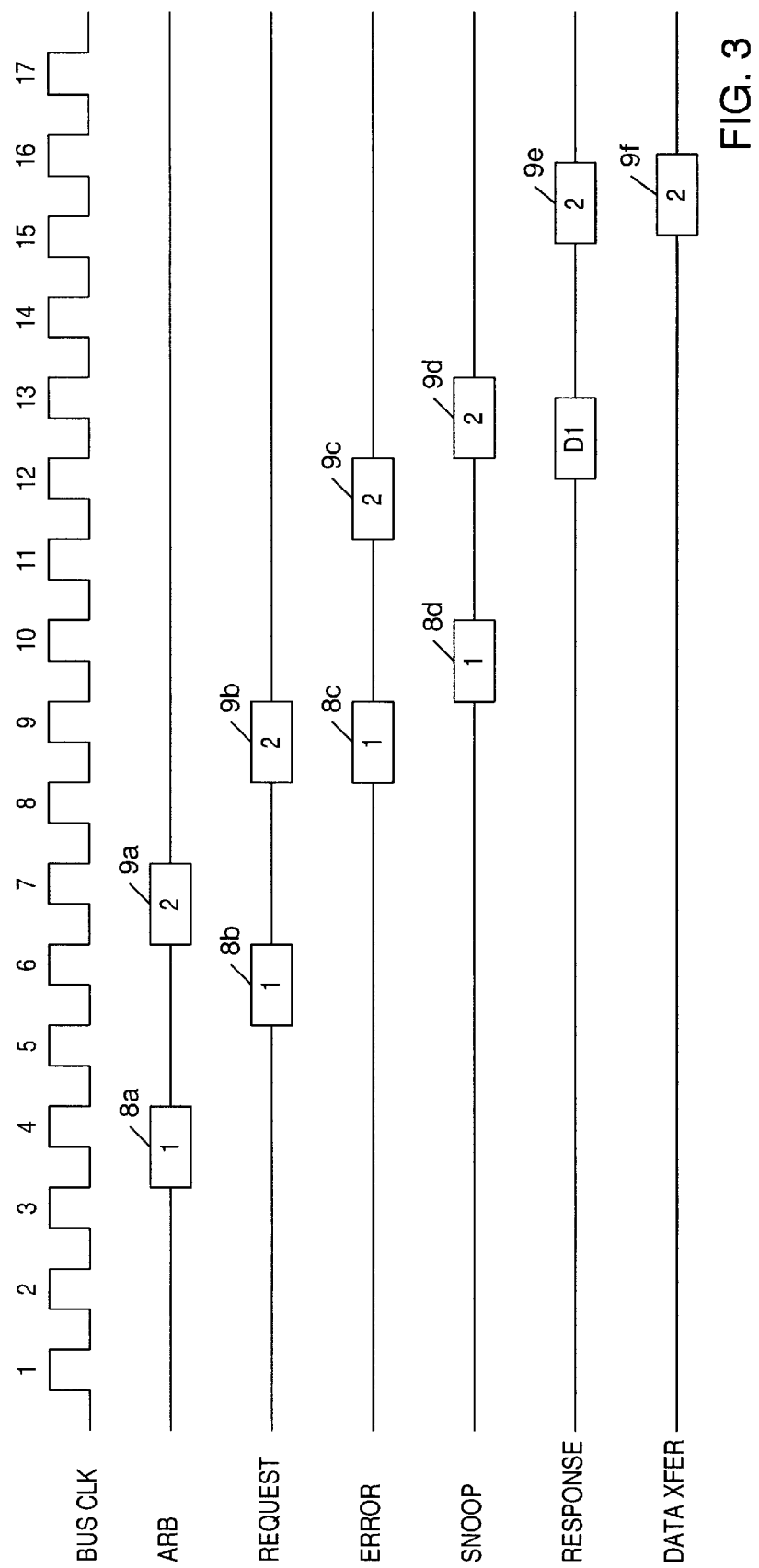
FIG. 3 is a timing diagram of transactions pipelined through transaction phases of the processor bus.

Turning to FIG. 2, details regarding bus interface unit 14 are shown. The various sub-components of interface unit 14 can be connected on a monolithic substrate for high end computer applications. Interface unit 14 operates in conjunction with other bus interface units such as interface unit 28, and preferably includes at least four interfaces and multiple address and data queues. Each interface is unique to the specific bus protocol of the bus to which is connects. As shown, the PCI interface ("PCI IF") includes a PCI controller 40 which enables transfer of information (control, address and data) to and from the PCI bus.

Figure 6:
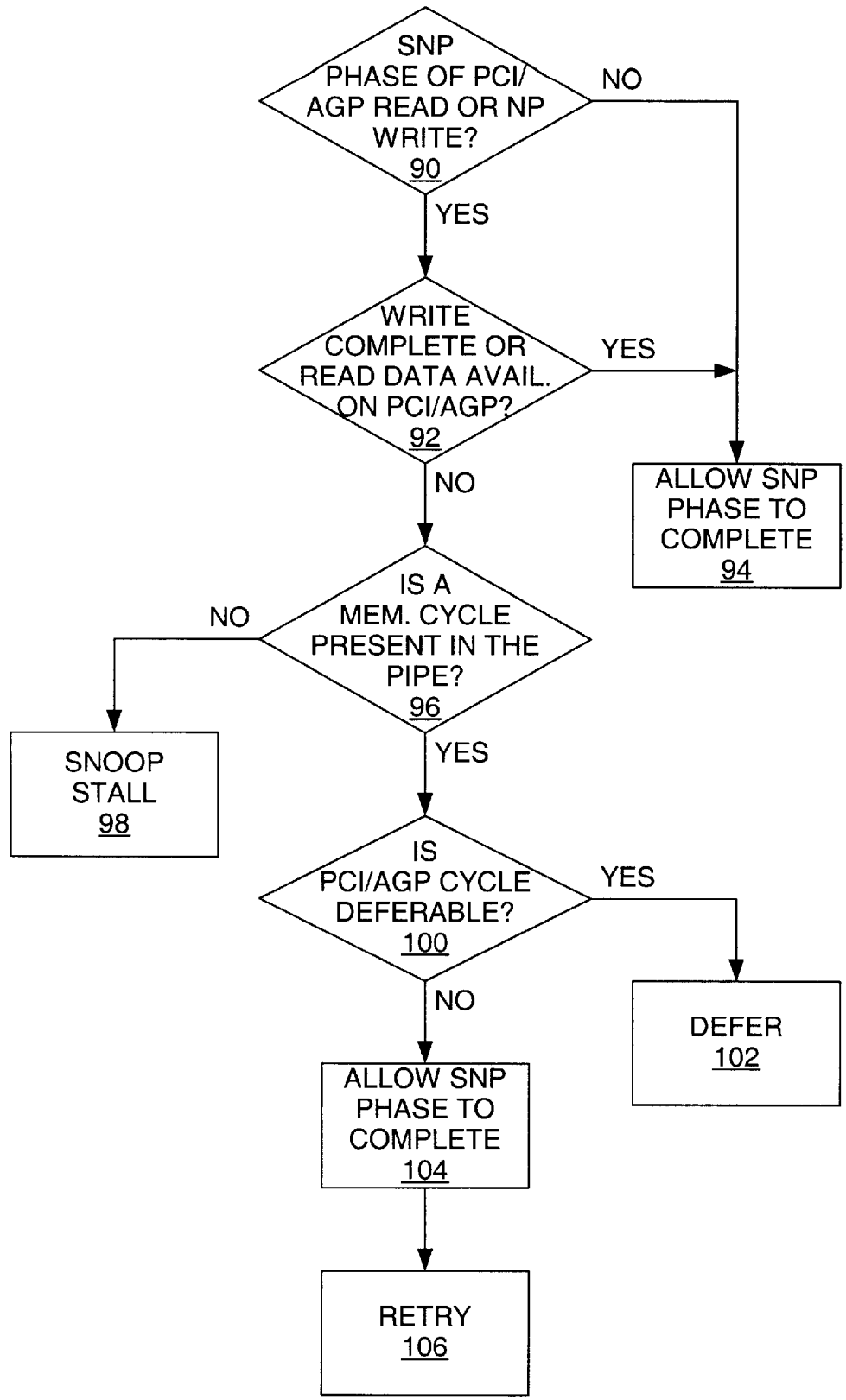
FIG. 6 is a flow diagram of decisional activities occurring within a snoop phase depending on the type of cycle presented to the snoop phase and/or the type of cycles subsequently presented to the pipeline.

Attributed to each of the other busses is a respective controller which provides an interface for information sent across the respective bus. Thus, in addition to the PCI controller 40, a processor controller 42, a memory controller 44 and an AGP controller 46 are embodied within interface controller 14, as shown in FIG. 6. In addition to the various controllers, there are multiple address and data queues. Each controller operates independent of the others, and cycles are passed between controllers using queues which link respective controllers. FIG. 2 illustrates ten queues: processor-to-memory queue (P2M queue) 50a, processor-to-PCI/AGP queue (P2I/A queue) 50b, memory-to-processor queue (M2P queue) 50c, memory-to-PCI queue (M2I queue) 50d, PCI-to-memory queue (I2M queue) 50e, PCI/AGP-to-processor queue (I/A2P queue) 50f, AGP-to-memory queue (A2M queue) 50g, memory-to-AGP queue (M2A queue) 50h, and PCI-to-AGP queue (I2A queue) 50i, and memory-to-GCI queue (M2GCI2 queue) 50j. It is recognized, that if needed, an additional graphics interface (i.e., GCI) beyond AGP can be used for graphics intensive applications. Each of the queues 50 shown in FIG. 2 communicate with each other through the various controllers and/or control signals routed directly between respective queues. Separating the major blocks as shown allows for a significant amount of concurrency.

Processor controller 42 controls the CPU interface and the various queues 50 linked to the CPU interface. Processor controller 42 allows the CPU (or processor) to pipeline cycles and allows several cycles to be stored within the processor controller. Additionally, processor controller 42 schedules accesses to cache storage locations within one or more processors.

Memory controller 44 controls possibly multiple banks of SDRAMs, as well as the CS, DQM, RAS, CAS, WE and CKE signals sent to those banks. In addition, memory controller 44 generates several control signals to respective queues 50 for memory data bus control. Memory controller 44 arbitrates among processor writes, processor reads, PCI writes, PCI reads, AGP writes, AGP reads, and refresh. Arbitration for each cycle is pipelined into the current memory cycle which ensures that the next memory address is available on the memory bus before the current cycle is complete. This results in minimum delay, if any, between memory cycles. Memory controller 44 is capable of reading ahead on PCI master reads and will do so if the PCI master issues a read multiple command. Interface unit 14 can then continue providing data to the PCI master at a high rate.

PCI controller 40 ensures compatible interface to the PCI bus protocol. When the processor accesses the PCI bus, PCI controller 40 operates as a PCI master. When a PCI master, (e.g., PCI I/O device) accesses memory, PCI controller 40 acts as a PCI slave. Processor-to-PCI cycles are buffered in queue 50b and then presented to controller 40. Controller 40 must determine when this queue needs to be emptied before running in a slave mode.

Processor controller 42 can also be thought of as any device responsible for decoding processor cycles, running snoops to the processor cache storage locations, and providing miscellaneous logic such as soft reset. Functionality of a processor controller used in the bus interface unit is one which can accept cycles from the CPU bus and then parses out those cycles to the appropriate controllers 40, 44, 46 and/or queues 50. It is recognized that the processor controller consists of a number of sub-modules that can be grouped into various logic subsystems such as a processor bus tracker/queue cycle manager, a processor bus master state machine, snoop control, etc. Similar to processor controller 42, the PCI controller 40 (or the AGP controller 46) is also well known as containing a series of state machines which control the PCI/AGP interface. Data passing through the PCI controller 40 is preferably broken into three basic sub-modules: PCI master interface, PCI target (slave) interface and PCI glue logic. PCI controller 40 communicates with memory controller 44, processor controller 42 and queues 50 through various control signals internal to interface unit 14. AGP controller 46 interfaces externally to a 66 MHz, 32 bit AGP/PCI bus and interfaces internally to controllers and queues. Memory controller 44 supports AGP master reads and writes to the system memory using AGP or PCI protocol. Processor controller 42 initiates PCI protocol reads and writes to the AGP master frame buffer and registers. The various queues 50 provide data flow buffers between interfaces.

The various queues 50 can be classified as address and data queues or merely data queues depending on the flow direction of information and the controllers being linked by the respective queues. The following Table I represents a list of the various data and address queues 50, their size, and the data/address flow of each queue:

TABLE I

| Queue Name | Data/Address | No. Locations | Source | Destination |
|---|---|---|---|---|
| P2M(A) | address | 4 slots | Processor | memory |
| P2M(D) | data | 4 cache lines | Processor | memory |
| P2I(A) | address | 8 slots | Processor | PCI or GCI |
| P2I(D) | data | 8 quad words | Processor | PCI or GCI |
| M2P | data | 2 cache lines | Memory | processor |
| I2P | data | 2 cache lines | PCI or GCI | processor |
| I2M(A) | address | 4 slots | PCI | memory |
| I2M(D) | data | 4 cache lines | PCI | memory |
| M2I | data | 2 cache lines | Memory | PCI |
| M2A | data | 8 cache lines | Memory | AGP |
| M2GCI(D) | data | 2 cache lines | Memory | GCI |
| A2M(D) | data | 8 cache lines | GCI or AGP | memory |
| A2M(A) | address | 8 slots | GCI or AGP | memory |
| I2GCI(A) | address | 8 slots | PCI | GCI |
| I2GCI(D) | data | 8 quad words | PCI | GCI |

It is recognized that numerous other queues can be employed. It is also recognized that for a PCI or AGP peripheral device to write to memory, the respective I2M queue and A2M queue transfer both address and data information before presenting that information to the memory controller 44. Information sent from PCI controller 40 (or AGP controller 46) to processor controller 42 is buffered merely as data within the I/A2P queue 50f, and information sent from the processor controller 42 to memory controller 44 is buffered as address and data within the P2M queue 50a.

Figure 4:
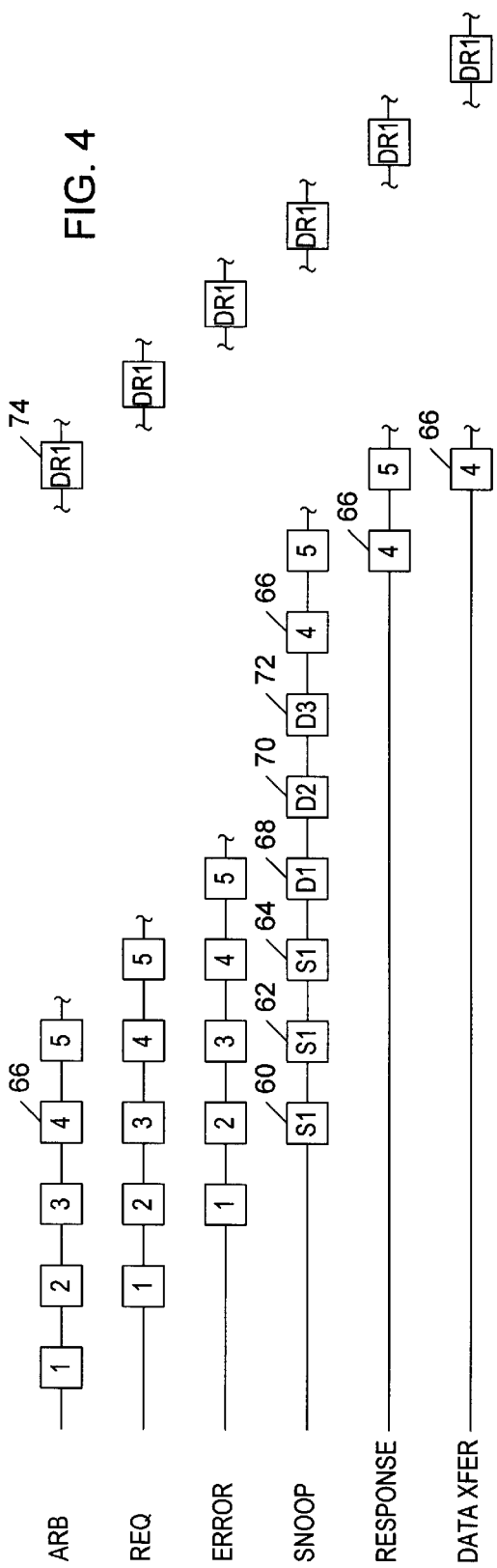
FIG. 4 is a diagram of transactions occurring in timed order, wherein the pipeline is stalled during the snoop phase to allow transactions which occur earlier than a pipelined memory transaction to be deferred until after the memory transaction is at least partially completed.

FIG. 4 illustrates transactions occurring across the CPU bus and presented to the processor controller in timed order. More specifically, various phases of the CPU local bus is shown accommodating cycles introduced into those phases and pipelined (sequential) order. FIG. 4 indicates transaction "1" is stalled 60 when it arrives in the snoop phase. Since transaction 1 is stalled 60, all subsequent transactions are also stalled. Shown in FIG. 4 is three occurrences of stall, 60, 62 and 64 prior to the snoop phase receiving transaction 4 into the arbitration phase, as indicated by reference numeral 66. In the example shown, transaction 66 may be a transaction which must be completed through the CPU local bus as quickly as possible. According to one embodiment, transaction 66 is a cycle to local memory, and the previous cycles 1, 2 and 3 are cycles to a peripheral device connected to the PCI bus, the AGP bus or, for example, the ISA bus. Stalling the first transaction indicated by reference numerals 60, 62 and 64 allows transaction 66 to pipeline to the snoop phase, whereby the first, second and third transactions can then be deferred or retried, as indicated by reference numerals 68, 70 and 72, respectively.

Deferring or retrying the first, second and third transaction to a peripheral device places those transactions outside the in-order queue of the pipeline and affords the transaction of interest, i.e., the 4th transaction 66 to arrive on the snoop phase. Transaction 66 may then be allowed to continue throughout the pipeline to the response and data transfer phases, as shown. Being that transaction 66 is possibly a memory cycle, all caching agents are required to perform an internal snoop operation and appropriately return a hit or miss signal. Those signals are used to indicate that the cache line is either valid or invalid in the snooping agent, whether the cache line is in a modified (dirty) state within the cache line agent, or whether the snoop phase needs to be extended. The snoop phase is extended (stalled) if both the hit and hit modified (i.e., HIT# and HITM#) are sampled asserted together in the snoop phase. If both are sampled together, then the caching agent is deemed not ready to indicate snoop status, and that agent needs to stall the snoop phase. The snoop signals (HIT#, HITM# and DEFER#) are sampled again two clocks later. This process continues as long as the stall state is sampled. The snoop stall is provided to stretch the completion of the snoop as needed by any agent that needs to block further progress of snoops. As shown in FIG. 4, snoop stall is performed on the first transaction and can occur for multiple pairs of clock cycles as shown by reference numerals 62 and 64.

The DEFER# is deasserted to indicate that the transaction can be guaranteed in-order completion. An agent asserting DEFER# insures proper removal of the transaction from the in-order queue by generating the appropriate response. In FIG. 4, the transactions which are removed from the in-order queue are indicated as transactions 68, 70 and 72. There are three valid responses when DEFER# is sampled asserted (and HITM# is sampled deasserted): a deferred response implies that the operation will be completed at a later time, a retry response implies that the transaction must be completed at a later time but cannot be deferred, or a hard error response.

The transactions which are deferred are presented with a tag which indicates the responses which must be re-initiated, beginning at the arbitration phase. Those transactions are often referred to as deferred response transactions or deferred reply transactions. DEFER# is preferably asserted by an addressed input/output agent (peripheral device) if the agent is unable to guarantee in-order completion of the requested transaction. If DEFER# is sampled asserted, and HITM# is inactive, the agent asserting DEFER# must reply with a defer or retry response for that transaction. Only the addressed agent can assert DEFER#. The requesting agent must not begin another order-dependent transaction until either DEFER# is sample negated in the snoop phase, or the deferred transaction receives a successful completion via a deferred reply or a retry. FIG. 4 illustrates a deferred reply 74 progressing through the various phases subsequent to completing the non-deferred, memory-destined transaction 66. According to one implementation, and not shown in FIG. 4, deferred cycles continue to the response phase even though the data transfer is deferred relative to data transfers associated with later-presented requests. Thus, the response phase of cycles being deferred causes a "returned" response to occur. According to another implementation, a maximum of only two cycles can be deferred.

Figure 5:
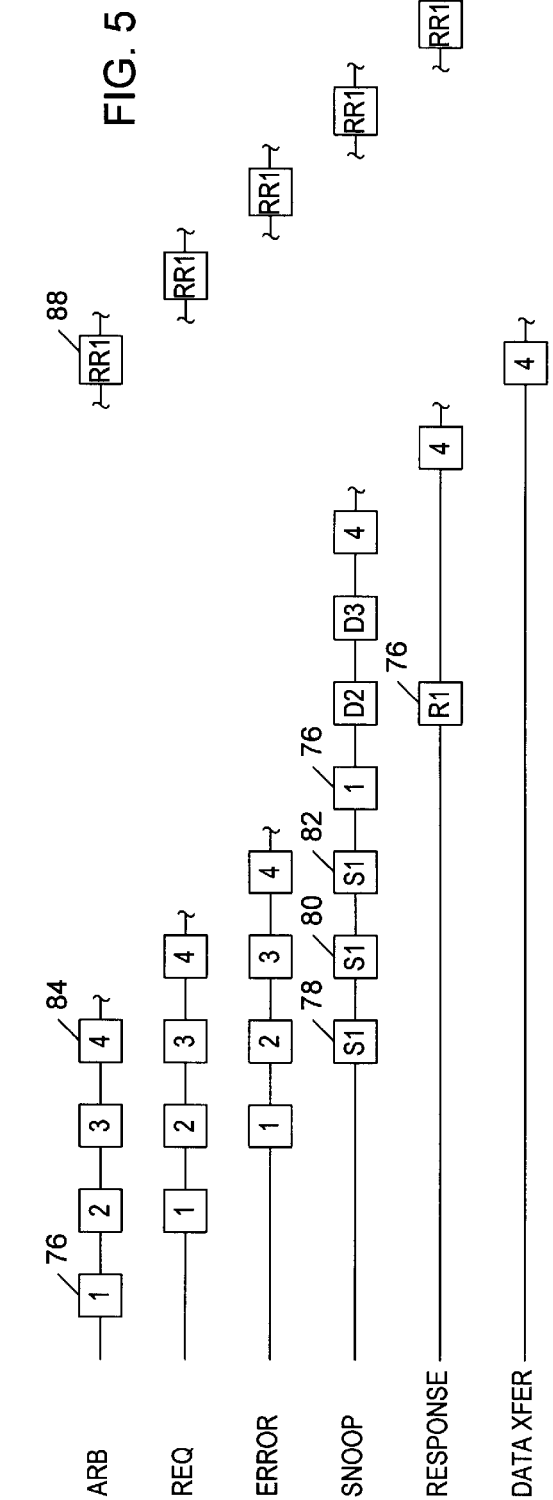
FIG. 5 is a diagram of transactions occurring in timed order, wherein the pipeline is stalled during the snoop phase to allow a non-deferrable transaction which occur earlier than a pipelined memory transaction to be retried after the memory transaction is at least partially completed.

FIG. 5 illustrates an instance where a transaction is retried instead of being deferred. In the example shown, the first transaction is allowed to continue from the initial, arbitration phase through the snoop phase and onto the response phase. The first transaction is initially stalled 78, 80 and 82 until a memory-destined cycle 84 is about to enter the snoop phase. If first transaction 76 is non-deferrable, then transaction 76 progresses to the response phase 76. The response agent is then the agent responsible for completing the transaction at the top of the in-order queue (i.e., the first transaction within the response phase queue, as noted by reference numeral 76). The response agent is therefore the agent addressed by the first transaction, whereby the response agent asserts a response which indicates one of the valid transactions responses available to that agent. At least one valid transaction response is that the addressed response agent sends a retry response to the processor which can then re-initiates that transaction, as shown by reference numeral 88.

FIG. 5 indicates that if the first cycle or transaction 76 is retried, the second and third cycles do not need to be retried if they can be deferred. If the processor initiates a cycle before the end of the snoop phase of a previous cycle, the processor is indicating that there is no dependency between those cycles. Accordingly, cycles before the memory-destined cycle 84 can be deferred retried. If the cycles get retried, the processor keeps track of the order in which the transactions must be initiated back across the processor local bus. If cycles get deferred, once the cycle that got deferred completes on either the PCI or AGP bus, the bus interface unit initiates a deferred reply transaction to notify the CPU that the transaction is complete and returns data if the original cycle is a read cycle.

FIG. 6 illustrates a flow diagram of decisional activities occurring within a snoop phase. A decision must be made based on the type of cycle entering the snoop phase, as indicated by reference numeral 90. If the cycle is destined for the peripheral bus (e.g., PCI or AGP bus), and is a read cycle or a non-postable write cycle, then examination of activities 92 on the peripheral bus is needed. However, if the transaction is not destined for a peripheral bus or is a postable write, then the snoop phase is allowed to complete 94. In other words, only peripheral read cycles or non-postable write cycles can be snoop stalled.

Snoop stalling certain peripheral-destined cycles occurs only if the peripheral bus is not available, or data from the peripheral bus is not available. If the non-postable write is complete on the peripheral bus or if data arrives from the peripheral bus as a result of a read operation, then the peripheral bus is available and the snoop phase is allowed to complete. However, if those conditions do not apply, then a further inquiry 96 must be made on whether a memory cycle is present within the pipeline. If a memory cycle is not present, then the peripheral cycles are snoop stalled 98. However, if a memory cycle is present, then determination must be made on whether the peripheral cycle is deferrable 100.

Instituting a defer cycle begins by issuing 102 a DEFER# signal from the snoop agent, which causes the peripheral cycle to be drawn from the in-order queue. The snoop phase will complete and a defer response will be issued in the response phase. If the peripheral cycle is not deferrable, then the snoop phase is allowed to complete for that cycle 104. Once the snoop phase is completed, the non-deferrable cycle enters the response phase. The response agent can then assert a retry response 106.

Not only is the present deferral mechanism dynamic in that a variable snoop stall can be achieved, but also deferred transactions occur only when absolutely necessary. Transactions and/or cycles are deferred or retried only if a memory cycle is encountered. In this manner, the clock delay penalty associated with deferred or retried transactions are minimized. Accordingly, the present bus interface unit and the snoop stall, defer, and retry mechanism thereof presents faster throughput of peripheral-destined transactions relative to conventional defer operations.

It will be appreciated to those skilled in the art having the benefit of this disclosure that this inventions is believed to be capable of performing efficient transfer of peripheral-destined cycles across a CPU bus from the CPU. Various modifications and changes may be made as would be obvious to a person skilled in the art having the benefit of this disclosure. It is intended that the following claims be interpreted to embrace all such modifications and changes and, accordingly, the specification and drawings are to be regarded in an illustrative rather than a restrictive sense.

What is claimed is:

1. A computer, comprising:
   a bus interface unit arranged upon a printed circuit board and coupled between a processor bus, a peripheral bus and a memory bus, wherein the bus interface unit comprises:
      a processor control interface adapted to receive a peripheral cycle issued from the processor bus to the peripheral bus and for stalling the peripheral cycle during a snoop phase of the processor bus pending availability of the peripheral bus, and the stalling of the peripheral cycle is changed to a deferring of the peripheral cycle when a memory cycle is pipelined onto the snoop phase from the processor bus to the memory bus;
   a peripheral device coupled to the peripheral bus, wherein the peripheral device is arranged outside the printed circuit board.

2. The computer as recited in claim 1, wherein the processor bus comprises an initial phase of a plurality of phases into which the memory cycle is placed after the peripheral cycle is stalled in the snoop phase.

3. The computer as recited in claim 1, wherein the peripheral cycle is deferred during the snoop phase until after the memory cycle has at least partially completed a plurality of phases subsequent to the snoop phase.

4. The computer as recited in claim 1, wherein the peripheral cycle is deferred during the snoop phase until after the memory cycle has entered a data transfer phase in which data is transferred across the processor bus.

5. The computer as recited in claim 4, wherein the data is transferred either to or from the memory bus.

6. The computer as recited in claim 1, wherein the peripheral bus is a peripheral component interface (PCI) bus.

7. The computer as recited in claim 1, wherein the peripheral cycle is forwarded to a response phase and retried by the processor after the memory cycle has at least partially completed a plurality of phases subsequent to the snoop phase.

8. The computer as recited in claim 1, wherein the peripheral cycle is forwarded to a response phase and retried after the memory cycle has entered a data transfer phase in which data is transferred across the processor bus.

9. A processor bus, comprising:
   a plurality of phases which can accommodate a plurality of cycles of dissimilar transactions pipelined into a sequential order of said plurality of phases;
   a peripheral cycle destined for a peripheral device, wherein the peripheral cycle is clocked through a subset of the plurality of phases and into a snoop phase of the plurality of phases; and
   a memory cycle destined for a semiconductor memory, wherein the memory cycle is clocked entirely through the plurality of phases while the peripheral cycle is stalled within the snoop phase and then deferred from the snoop phase to an initial phase of the sequential order of phases.

10. The processor bus as recited in claim 9, further comprising a peripheral device embodied upon a printed circuit board external to another printed circuit board on which the processor bus is configured.

11. The processor bus as recited in claim 9, wherein the processor bus is coupled to a bus interface unit which initiates signals used to stall the peripheral cycle in the snoop phase.

12. The processor bus as recited in claim 9, wherein the processor bus is coupled to a bus interface unit which initiates signals used to defer the peripheral cycle back to the initial phase of the sequential order of phases.

13. The processor bus as recited in claim 9, wherein the peripheral device is operably coupled to a peripheral component interface (PCI) bus.

14. The processor bus as recited in claim 9, wherein the peripheral device is operably coupled to an industry standard architecture (ISA) bus.

15. The processor bus as recited in claim 9, wherein said semiconductor memory comprises random access memory (RAM).

16. A method for servicing a memory cycle destined for system memory ahead of a peripheral cycle destined for a peripheral device, comprising:
   stalling the peripheral cycle within a snoop phase of a processor bus;
   deferring the peripheral cycle when the memory cycle arrives within the snoop phase;
   allowing the memory cycle to continue at least partially through the remaining phases of the processor bus; and
   re-issuing the peripheral cycle from an initial phase of the processor bus.

17. The method as recited in claim 16, wherein said stalling continues a variable number of clock cycles upon the processor bus until data from a non-posted write transaction has been transferred to the peripheral device.

18. The method as recited in claim 16, wherein said stalling continues a variable number of clock cycles upon the processor bus until data from a read transaction has arrived upon the processor bus from the peripheral device.

19. The method as recited in claim 16, wherein said stalling continues a variable number of clock cycles upon the processor bus until the memory cycle arrives within the snoop phase.

20. The method as recited in claim 16, wherein said stalling comprises stalling the peripheral cycle and additional peripheral cycles arriving within the snoop phase prior to the memory cycle.

21. The method as recited in claim 16, wherein said deferring comprises deferring the peripheral cycle and additional peripheral cycles arriving within the snoop phase prior to the memory cycle.

22. The method as recited in claim 16, further comprising retrying another peripheral cycle arriving within the snoop phase prior to the memory cycle.

* * * * *